Sept. 15, 1942.    A. BEACH    2,295,539
APPARATUS FOR SERVICING HYDRAULIC BRAKES
Filed April 11, 1940    2 Sheets-Sheet 1
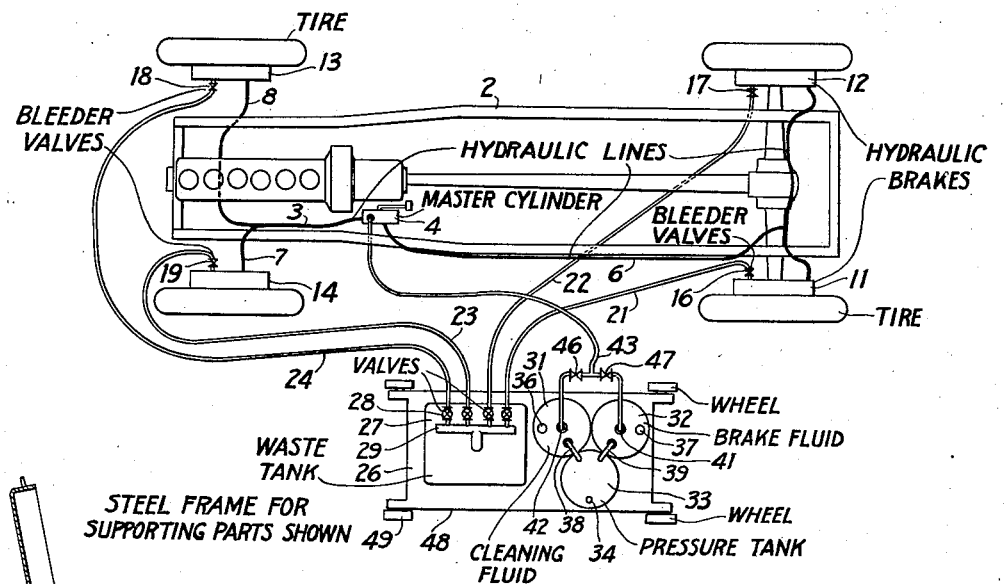
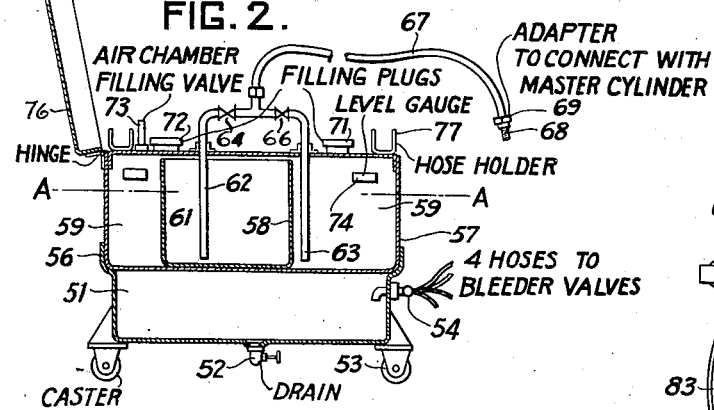
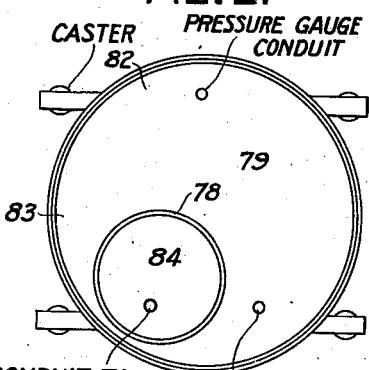
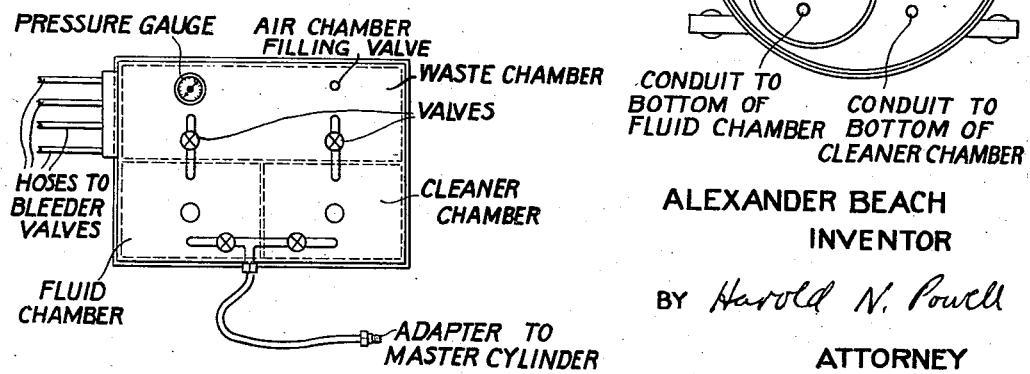
ALEXANDER BEACH
INVENTOR
BY Harold N. Powell
ATTORNEY Sept. 15, 1942. A. BEACH 2,295,539
APPARATUS FOR SERVICING HYDRAULIC BRAKES
Filed April 11, 1940 2 Sheets-Sheet 2
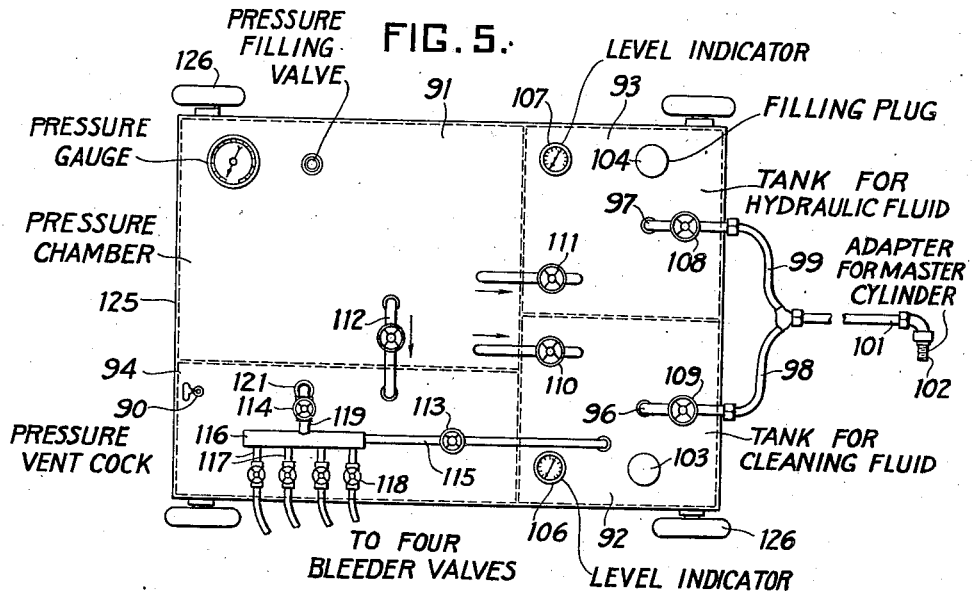
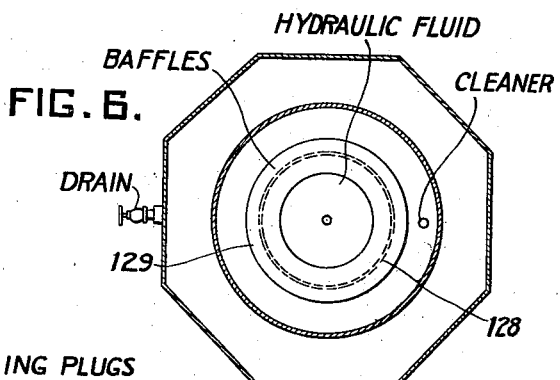
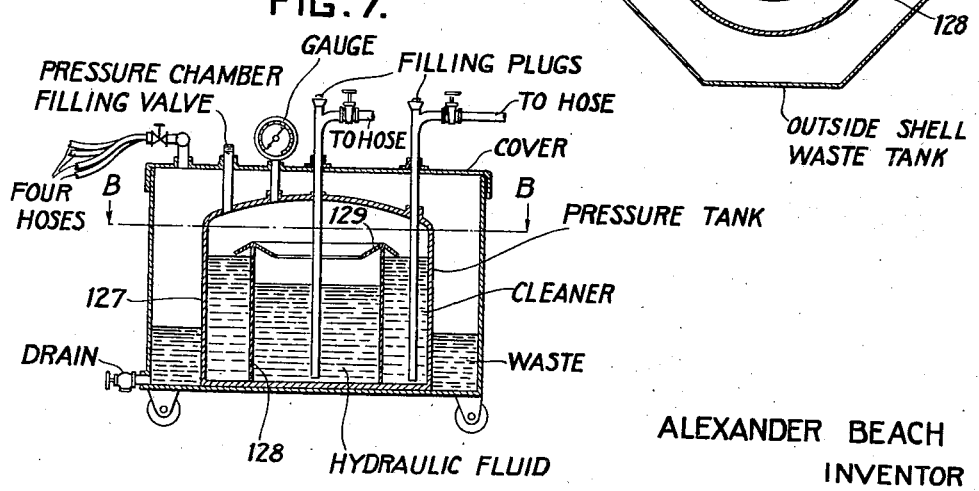
ALEXANDER BEACH
INVENTOR
BY Harold N. Powell
ATTORNEY Patented Sept. 15, 1942

2,295,539

UNITED STATES PATENT OFFICE 2,295,539

APPARATUS FOR SERVICING HYDRAULIC BRAKES

Alexander Beach, Rochester, N. Y., assignor to Puritan Company, Rochester, N. Y., a corporation of New York Application April 11, 1940, Serial No. 329,043

12 Claims. (Cl. 188—152)

This invention relates to apparatus for cleaning, flushing, filling, recharging or otherwise similarly servicing hydraulic systems, and more particularly to apparatus and process for simultaneously flushing or cleaning and thereafter refilling at one time all the hydraulic brake system on the modern automobile.

The automobile is discussed in particular in connection with my invention, inasmuch as the braking system thereof constitutes the most common type of hydraulic system to which my invention may be applied. As is well known such automotive systems comprise several separate braking units (usually four) attached to the wheels.

Under present practice each wheel (brake thereon) is handled more or less separately. That is each brake, i. e. wheel cylinder and line leading thereto, and in the following claims and description the term "brake" is used in this sense, may be drained separately and new hydraulic fluid flowed into or through the system for a sufficient length of time to wash out the old fluid and some of the dirt, gum or other deposits. The equipment for this prior art type of servicing has merely comprised gravity flow or in some instances, an electric pump connected to a source of fluid.

For example in the "two man method" used in many service stations only manually obtained pressure would be employed. That is, the master cylinder is filled with the material that it is desired to introduce into the system. One service man pumps the brake pedal of the car, while a second service man opens the bleeder valve on the brake being serviced and otherwise tends to the servicing at this point. Each other brake of the system is treated in a like manner. It is apparent therefore, that this is not an efficient solution of the brake servicing problem. Furthermore it is clear that all, of a multiple braking system, (four wheels) have not been, nor could be, efficiently serviced by such procedure.

It is readily apparent that such prior art procedure is slow and in the event a lift is unavailable, and even when a car is on a lift, entails considerable labor of making several trips to each brake. The disadvantages are further aggravated if it becomes necessary to crawl under the car several times or reach under or otherwise go to each wheel to determine if the old fluid is being removed from each brake, if the brake has become clean and finally if fresh hydraulic fluid has satisfactorily filled the brake. Furthermore the present practice of using brake fluid for attempting to flush out the system is expensive and in most instances the character of the fluid, being for another purpose, namely the lubrication of the brake and transmitting of pressure, does not satisfactorily remove gummy deposits or other similar impediments which would impair the operation of the system.

In view of the fact that a large number of the braking systems are hydraulic type and that the present trend is to that type exclusively, it is readily apparent that the development of a new apparatus and method for facilitating the servicing of hydraulic braking systems is a highly desirable result.

After extensive investigation I have developed a new apparatus and method whereby multiple hydraulic braking units (wheel cylinders and lines as above mentioned) may be serviced with a thorough cleaning, refilling and with a minimum of inconvenience. By my novel apparatus and procedure it is also possible to service such systems with greater speed.

For a more complete understanding of my invention reference is made to the attached drawings forming a part of the present application, in which:

Fig. 1 is a top view, wherein certain parts have been shown in skeleton form or on exaggerated scale for clarity, of my apparatus being employed in connection with the servicing of automotive hydraulic braking systems.

Fig. 2 is a side elevation view of my apparatus, showing compactness thereof.

Figs. 3, 4, 5 are top views, taken at various sections, showing modifications of arrangements of parts that may be had in constructing my invention.

Fig. 6 is a top view taken on the line B—B of Fig. 7.

Fig. 7 is a side elevation view in section showing still another modification of internal arrangement.

Fig. 1 will now be described in detail. As above indicated, for clarity many of the parts comprising my invention have been shown in exaggerated or extended form. In Fig. 1, 2 represents the chassis of an automobile. Many parts have been omitted since it is desired to refer principally to the braking system 3. This system essentially comprises the master cylinder 4. This master cylinder is connected by a plurality of conduits 6, 7, 8 to multiple (in this instance four) brakes on independent wheels. These brakes are designated 11, 12, 13, 14. Each brake, as is customary has a bleeder valve associated therewith, as indicated at 16, 17, 18, 19. Because of the customary location of such bleeder valves as indicated on the brakes under the car, it is apparent that they do not lend themselves to long periods of inspection and while accessible, do present difficulty when servicing.

In accordance with my invention each one of the bleeder valves (four in the instance under consideration) is connected to my novel apparatus. This is accomplished by the several flexible conduits 21, 22, 23, 24. Suitable fittings (not shown) would be provided for connecting these several conduits to the bleeder valves. Preferably a universal connector would be employed so that it fits any bleeder valve, however if desired detachable fittings may be used.

These several flexible conduits lead to my novel servicing apparatus indicated in its entirety at 26. The parts thereof are shown in extended arrangement and would preferably be more compactly arranged as will be described in detail hereinafter. The several conduits are attached to the connector 29. Each conduit includes in series, valves 28 the function of which will be described in detail hereinafter. The connector leads into the waste tank 27. Preferably adjacent the waste tank, or in the near vicinity are a plurality of tanks 31, 32, 33 for cleaner, new brake fluid and air pressure. The pressure tank may be of any suitable construction to withstand pressures of from 10–100 lbs. per sq. in. or more and is provided with an air inlet valve 34 much the same as an auto tire valve and adapted to be charged from the conventional source of air available in any filling or service station for inflating tires.

The tanks 31, 32 are pressure tight and adapted to contain the cleaner and fluid, respectively, aforementioned. Filling plugs for these materials are provided at 36, 37. These tanks may be connected with the pressure tank by conduits, valved if desired, 38, 39, or directly as will be described hereinafter. Or pressure tank 33 may be omitted entirely.

Tanks 31, 32, are provided with the internally extending pipes 41, 42 which extend to or towards the bottom of the tanks so that the contents thereof may be withdrawn through conduit 43 to the master cylinder 4. Valves will preferably be provided as at 46, 47 or at any other suitable point in the circuit, pipes, 41, 42—hose 43. The tanks may all contain pressure gauges, relief valves or other safety devices, liquid level measuring devices or other mechanisms for measuring contents, etc.

The entire equipment is mounted on a framework 48, provided with wheels, casters or the like 49 to render it mobile.

Referring now to Fig. 2, there is shown a compact arrangement such as might be constructed embodying my invention. The base 51, comprises the waste tank and is equipped with the drain petcock 52. Casters as aforementioned are provided at 53. The several flexible conduits for attachment to the bleeder valves are associated with the waste tank at 54, in a manner comparable to that already described.

This base, by means of the flanged upper edge 56 is adapted to support the cleaner tank, fluid tank and pressure tanks, which in this instance may be a unitary structure. That is the single tank 57 may be provided with partitions as for example 58 to obtain a chamber 59 for cleaner and a chamber 61 for fluid. By running part 58 nearly to the top of the apparatus splashing or vapor diffusion of the contents may be prevented yet the pressure will operate on both chambers. The pressure chamber is shown in views hereinafter discussed. Although this additional chamber may be provided for pressure—pressure may be added directly to chambers 59 and 61. The pipes aforementioned extending substantially to the bottom of the cleaner and fluid chambers are designated 62, 63.

These pipes connect through valves 64, 66 to the flexible conduit 67 which leads to the master cylinder. A threaded nipple or suitable adapter 68 with a swivel coupling 69 is provided in order that the element may readily be attached to the master cylinder. It is of course understood that a universal and/or interchangeable nipple, washer and the like may be employed for obtaining a pressure tight connection with the master cylinder.

Filling valves 71, 72, air chamber filling valve 73, and level indicators 74 will be provided as already described. As added refinements a hinged cover may be provided at 76 and a hose support at 77.

Fig. 3 shows how the internal construction, as for example taken on the line A—A of Fig. 2, may be arranged if a cylindrical shape is desired, a suitable partition or inner container 78 may be placed in the apparatus to obtain the air chamber of desired size 82 in combination with cleaner chamber 83 and fluid chamber 84. The arrangement shown is cylindrical but other configurations and arrangements may be employed.

Fig. 4 shows a somewhat similar arrangement but in this instance a square or rectangular embodiment is obtained. Inasmuch as the various parts are apparent from the preceding description and will be discussed in detail with respect to Fig. 5 further description is unnecessary.

In Fig. 5 a pressure tank 91, is shown in communicative contact with the cleaner tank 92, fluid tank 93 and waste tank 94. While external valved conduits 110, 111 have been shown, in the instance of tanks 92 and 93, mere pressure tight openings between the pressure tank and the respective tanks will suffice to permit pressure transference.

The tanks 92, 93 contain internally extending pipes 96, 97 so that the contents of the tanks may be forced therethrough to the flexible conduits 98, 99 which merge into the single conduit 101 which leads to the master cylinder. This single conduit terminates in a suitable nipple or adapter 102 as already described. In the event the master cylinder does not contain provision for air dissipation or an air pocket the nipple would be sufficiently elongated to extend into the cylinder to the desired liquid level. These tanks would also contain filler plugs 103, 104 and level indicators 106, 107. There may be valves 108, 109 and if desired valves in lines 110, 111. The valves may be of a variety of constructions. For example the valves on the flexible rubber conduits may comprise extra heavy "laboratory" pinchcock type, applied externally of the conduit. Or metal gate valves can be cut directly into the conduits. Either a ball or wedge may constitute the closure mechanism of the valve. Inasmuch as conventional valves may be used further description is unnecessary. These valves may be dual or reversible in operation.

The waste tank 94 is positioned near the aforementioned elements and may be connected to one or more of the other tanks by conduits 112, 115. The object of such interconnection is that in some instances as for example by opening valve 113 and closing valve 114, the direction of flow of cleaner may be changed and scrubbing action and/or countercurrent flow obtained. In this instance it might be desirable to connect the master cylinder to waste. Or pressure may be introduced into waste tank 94 for facilitating the discharge of the waste contents. When waste tank 94 is operating as such it is desirable to vent the tank to atmospheric pressure as through petcock 96.

Tank 94 is equipped with the metal header 116 provided with the plurality of nozzles 117 to which the several flexible conduits from the bleeder valves are attached as described in connection with Fig. 1. Independent valves are included in each of the several lines, and as pointed out above may comprise clamps encircling the flexible conduits. One or more sight glasses 119 would be provided as in the discharge conduit 121 to the waste tank or in elements 117. By this arrangement the operator servicing the brakes can easily observe the progress of the cleaning and/or filling operations without the necessity of getting under the car and noting the discharge from each individual bleeder line as at present. Furthermore by having everything at hand, as in my invention the speed of operation can be materially improved.

The entire apparatus is mounted on a carriage 125 rendered mobile by casters or wheels 126.

Therefore it can be seen that compactness of my novel apparatus may be obtained in various ways using in some instances conventional tanks and fittings. Figs. 6 and 7 are set forth in particular to illustrate still further embodiments wherein a conventional pressure tank 127 and other parts are used. The function and construction of the various parts in Figs. 6 and 7 are apparent from the preceding description and legends appearing on these figures. It is desired to point out only that in this construction where there are open partitions 128 that splash lips may be provided at 129 as an added refinement, or the partitions may be carried higher.

The operation of the apparatus would be as follows. Reference is made in particular to Figs. 1 and 5 for assistance in the description thereof. The operator fills the respective tanks about ⅔ full of cleaner and new fluid. The pressure tank is filled for example to 25–75 lbs. sq. in. air pressure. During these operations the valves 46 and 47 would be closed.

The apparatus is then brought near the car that is to be serviced, or under the car if on a lift. The flexible conduit 43 is then attached to the master cylinder 4 with a suitable nipple to fit the particular master cylinder in question in a pressure tight manner.

The several flexible conduits 21, 22, 23, 24 are connected one to each of the bleeder valves 16, 17, 18, 19. The exact order of these operations is not a limitation on my invention, but for example the bleeder valves may be connected first and opened and then the master cylinder connection made.

Assuming that the connections have been made, and the bleeder valves opened, the pressure from pressure tank 33 is then applied against the cleaner fluid in the cleaner tank 31. The valve 46 is then opened and the old contents in the master cylinder and hydraulic lines forced out of the bleeder valves into the several flexible conduits 21, 22, 23, 24, or in the case of the apparatus of Fig. 5, into the four conduits there shown.

Referring to Fig. 5 which shows the setup on a larger scale, by manipulating the valves 117 the flow of liquid from each brake can be controlled, or all the valves may be opened. By observing the flow through the glass indicator 119 the progress of the cleaning can be readily noted without a special trip to each brake.

When the liquid shows clear in the glass it can easily be noted that the cleaning has progressed sufficiently. In the event that it is thought one or more of the brakes requires more extended cleaning than the others, by my novel arrangement the valves in the other conduits may be closed off and the cleaning and entire pressure concentrated on the particular brake. Or by opening valve 113 and closing valve 114 etc. scrubbing action or counter current flow may be obtained in the system by changing the direction of cleaner flow. However usually in operation the concentration of the entire pressure and fluid on any particular brake, as may readily be done with my novel apparatus the cleaning of a dirty and gummed brake system may be satisfactorily accomplished.

It will be noted that all of these operations, and the progress of the cleaning, since it can be observed through the sight glass, can be accomplished quickly due to the compactness of the control, and without crawling under the car numerous times.

It is further contemplated that by suitable arrangement of the conduits and operation of the valves that cleaner may be forced in at one bleeder valve and out at another, or in any combination of wheels; or in at any wheel and out at the master cylinder. Inasmuch as the master cylinder is usually above the wheel cylinders this latter direction of flow is in some instance convenient. Similar remarks apply to the introduction of the brake fluid. However the following method is preferred in most instances.

Referring to Fig. 5, and assuming that the cleaning has taken place, the new brake fluid would be supplied to the system. The valves associated with the cleaning tank, as valve 109 would be closed. The valve associated with the fluid tank, as valve 108, would be opened (valve 109 being closed). The air pressure would then force the new fluid into the master cylinder displacing the cleaner in the system and causing it to flow out of the several bleeder valves into the several flexible conduits connected to the bleeder valves and through the sight glass or glass or without said glasses, as it emerges into the waste container.

By controlling the several valves 117 the flow into and from the several brakes may be directed in a manner analagous to that described above. Hence the new fluid may be diverted through any particular brake. When it is observed that fluid has reached each brake, as may be noted by opening the valve 117 in the conduit from that brake and observing the character of the liquid passing therethrough, the system may be considered as replenished. The apparatus may then be disconnected from the car and the bleeder valves and master cylinder closed.

It can be seen from the foregoing therefore that hydraulic brakes may be quickly and efficiently serviced without the disadvantage of having to crawl under the car many times. Inasmuch as substantially all the operations are controlled from a single panel considerable improvement is obtained in this respect. Furthermore, as indicated, several brakes may be refilled or otherwise serviced at one time; consecutively or in other order as is apparent from the preceding description. A fluid such as may be employed in my apparatus is described in U. S. Patent 2,238,045.

While as indicated many parts of my novel apparatus may be constructed of steel or iron, if desired brass, aluminum, copper or other metals, plastics and the like may be employed, or copper, steel, brass, rubber or fabric tubing may be used in certain of the conduits. The only limitation of materials is imposed by necessity of obtaining durable construction and parts which will not be subject to corrosion or chemical reaction in the presence of fluids used in the apparatus.

Usually I would not employ pressure much in excess of 50-lbs. per square inch in any one brake in order to be certain not to injure the rubber cups present in the brake system. The preferred apparatus, however, is constructed to hold a pressure far in excess of this preferred pressure as a safeguard against possible leakage and to increase the range of serviceability where rubber injury is not feared.

While my novel apparatus is preferably constructed substantially in accordance with one of the design indicated herein, it is susceptible to various modifications. It might be constructed for example, with only two pressure compartments, one containing fluid and one containing cleaning compound, as indicated in Fig. 3, operating conjointly through a single filler line connected with the master cylinder, and four bleeder lines which may or may not join at or near a common vent, with or without a sight glass, the same equipped with appropriate valves, said vent or vents discharging into an open can adjacent the tanks where a waste receptacle as shown is not desired.

In some instance it is also desirable that a separate pressure tank may be provided for pressure storage, that same in turn being used to charge the fluid tank, the cleaning compound tank and the waste receptacle tank if the same is desired; or the pressure tank may be omitted entirely from the apparatus and pressure charge applied directly to one or all the reservoirs referred to.

While as stated heretofore cleaning compound and/or brake fluid are added to the brake system preferably via the master cylinder, my novel apparatus may be constructed to operate in the reverse direction, namely to add the desired fluid via one or more of the wheel cylinders removing the discharged elements via the master cylinder; or as indicated, the system may be made to flow in either direction by appropriate control of pressure valves so that a scrubbing or "reverse flush" effect may be obtained.

It is also apparent from the description that the exact arrangement of separate tanks or compartments is not a limitation on my invention, it being clear that separate tanks may be used for each compartment, or one or more tanks may be subdivided in such a manner as to obtain the desired number of compartments. It is also to be understood that the several bleeder tubes for connecting with wheel cylinders may be discharged or filled through a common intake, or individually, and the flow through the same may be controlled by one valve or multiple valves.

It is also obvious that a sight glass may be put in each of the several lines and/or in a single common line or may be omitted entirely.

From the foregoing it is apparent that my invention is susceptible of some modification; hence I do not wish to be restricted excepting insofar as is necessitated by the prior art and the spirit of the appended claims.

What I claim and desire to secure by Letters Patent of the United States is:

1. Apparatus adaptable for the simultaneous servicing of all of a plurality of wheel cylinders and lines leading thereto, of an automotive hydraulic braking system having at least four of said wheel cylinders connected by said lines to a master cylinder, which comprises in cooperative relationship tanks, conduits, a receptacle and a flexible conduit having a fitting adapted to be attached to said master cylinder, a conduit leading to a tank adapted to contain cleaning liquid under pressure, and to a second tank adapted to contain hydraulic fluid under pressure, a third tank for supplying pressure to the aforementioned tanks associated therewith, valves positioned in said conduit so that the flow of either liquid into the conduit may be controlled, said tanks aforementioned being associated in a compact manner with said receptacle for receiving discharge from said wheel cylinders, the apparatus being characterized in that that said receptacle has four flexible conduits communicatively connected thereto and adapted to be affixed to each of said wheel cylinders, said flexible conduits including valve means whereby the flow of said discharge from any wheel cylinder to the receptacle may be controlled.

2. Apparatus for the simultaneous servicing of more than one of a plurality of hydraulic brakes and lines leading thereto, of a braking system having at least several remotely positioned brakes connected by said lines to a master cylinder, which comprises in cooperative relationship tanks, conduits, receptacle and a conduit adapted to be attached to said master cylinder, the conduit leading into a tank adapted to contain cleaning liquid under pressure and into a second tank adapted to contain hydraulic fluid under pressure, means for supplying pressure to the aforementioned tanks, valve means associated with said conduit so that the flow of either liquid into the conduit may be controlled, said tanks aforementioned being arranged in a compact manner with said waste receptacle, the apparatus being characterized in that that said receptacle has several conduits connected thereto adapted to be attached to each of said wheel cylinders, said last mentioned conduits including valve means and sight means in their circuit whereby the flow of discharge from any brake may be controlled and observed at a point near the point of discharge to said receptacle.

3. Apparatus for servicing wheel cylinders and lines leading thereto, of an automotive hydraulic braking system said wheel cylinders connected by said lines to a master cylinder, which comprises in cooperative relationship containers, receptacle, and conduits, conduit means adapted to be attached to said master cylinder, said conduit means leading to a plurality of containers adapted to contain cleaning liquid under pressure and hydraulic fluid under pressure, means for supplying pressure to the aforementioned containers, at least one valve positioned in said conduit so that the flow of either liquid into the conduit may be controlled, said containers aforementioned being associated with said receptacle for receiving discharge from said wheel cylinders, and said receptacle having a plurality of flexible conduits communicatively connected thereto through a sight glass and adapted for connection to each of said wheel cylinders, said flexible conduits including valve means whereby the flow of said discharge from any wheel cylinder may be controlled and observed.

4. A compact servicing apparatus for cleaning and recharging automotive hydraulic braking systems which comprises a pressure tight container for cleaning agent, a pressure tight container for recharging medium, a pressure tank in close association therewith for transmitting pressure thereto, a waste receptacle in close proximity to the aforementioned parts, tube means extending a substantial distance into said pressure tight containers but not into the waste tank and connected with an external conduit which terminates in nipple means, at least one valve interposed in the tube-conduit circuit, suitable filling orifices associated with each of said containers, said apparatus being characterized in that at least several conduits lead to said waste receptacle, the conduit-waste receptacle circuit including therein valves and sight glass means, said apparatus being mounted on a mobile support.

5. A compact servicing apparatus for cleaning and recharging hydraulic braking systems which comprises separate pressure tight containers or compartments for cleaning agent and recharging medium, means in close association therewith for transmitting air pressure thereto, tube means extending a substantial distance into said pressure tight containers and connected with an external conduit which terminates in attachment means, at least one valve interposed in the tube-conduit circuit, a waste receptacle in close proximity to the aforementioned parts, said apparatus being characterized in that said waste receptacle has at least several conduits, which terminate in one common conduit leading thereto, the several conduit-waste receptacle circuits including therein valves and means whereby flow therethrough may be observed the apparatus being mounted on a mobile support.

6. A servicing apparatus for cleaning and recharging hydraulic braking systems which comprises pressure tight containers, means in close association therewith for transmitting pressure thereto, a waste receptacle in close proximity to the aforementioned parts, at least several conduits leading to said waste receptacle, the several conduit-waste receptacle circuits including therein valves and sight glass means, said apparatus being mounted on a mobile support.

7. A servicing apparatus for cleaning and recharging hydraulic braking systems which comprises pressure tight containers, means for admitting air pressure to said containers, means for withdrawing the contents therefrom, a waste receptacle in close proximity to and supporting at least some of the aforementioned containers, at least several conduits leading to said waste receptacle and including in their circuit valves and sight glass means, said apparatus being mounted on a mobile support.

8. A servicing device of the class described which comprises pressure tight containers, at least one of the containers sharing a common wall with another container for rendering it pressure tight, means for admitting air pressure to said containers, means for withdrawing the contents therefrom, a waste receptacle in close proximity to and supporting at least some of the aforementioned tanks, at least several conduits leading to said waste receptacle and including in their circuit valves and sight glass means, said apparatus being mounted on a mobile support.

9. Apparatus for simultaneously servicing more than one of a plurality of hydraulic brakes and lines leading thereto, of a braking system having at least several remotely positioned wheel cylinders connected by said lines to a master cylinder, which comprises in cooperative relationship chambers and conduits, a conduit adapted to be attached to said master cylinder, said conduit connected to said chambers, one chamber adapted to contain cleaning liquid under pressure and another hydraulic fluid under pressure, means for supplying said pressure into said chambers, means associated with said conduit so that the flow of either liquid or fluid into the conduit may be controlled, said chambers aforementioned being arranged in a compact manner, and a plurality of conduits adapted to be attached to said wheel cylinders associated with the aforesaid parts, at least one of said conduits including means in its circuit whereby the flow of discharge from said wheel cylinders may be controlled and observed at a point near the compact arrangement aforesaid.

10. A servicing apparatus for cleaning and recharging hydraulic braking systems which comprises pressure tight chambers, means for admitting air pressure to said chambers, conduits for withdrawing the contents therefrom, a waste receptacle in close association with the foregoing chambers and supported at least in part by said apparatus, conduit means leading to said waste receptacle and including therein means whereby the flow of discharge to said waste receptacle may be observed.

11. A servicing device of the class described which comprises pressure tight chambers, at least one chamber for cleaning fluid and another chamber for hydraulic fluid, means for admitting pressure to said chambers, conduits for withdrawing the fluids, a holder attached to said device adapted to hold flexible conduits, a plurality of flexible conduits therein, a valve and sight means whereby the flow of fluid through a flexible conduit may be observed, included in series with at least one of said flexible conduits.

12. A mobile apparatus for servicing hydraulic braking systems which comprises a plurality of pressure tight chambers, conduit means interconnecting at least some of said chambers, a second conduit means for withdrawing liquid from said chambers, valve and further conduit means connected with the second conduit means, a waste receptacle which is supported by said apparatus, a holder adapted to hold flexible conduits attached to said apparatus, and also associated with the aforesaid parts a plurality of flexible conduits adapted to discharge into said waste receptacle, said flexible conduits being held by said holder and including in series therewith valve and sight means whereby the flow of fluid therethrough may be noted.

ALEXANDER BEACH.